(12) United States Patent
Saita et al.

(10) Patent No.: US 9,696,554 B2
(45) Date of Patent: Jul. 4, 2017

(54) COLOR SEPARATION OPTICAL ASSEMBLY AND IMAGE CAPTURE DEVICE

(71) Applicants: FUJIFILM Corporation, Tokyo (JP); Japan Broadcasting Corporation, Tokyo (JP); IKEGAMI TSUSHINKI CO., LTD., Tokyo (JP)

(72) Inventors: Arihiro Saita, Saitama (JP); Yuichi Sawahata, Saitama (JP); Kenichiro Masaoka, Tokyo (JP); Yukihiro Nishida, Tokyo (JP); Osamu Ozawa, Tokyo (JP)

(73) Assignees: FUJIFILM Corporation, Tokyo (JP); JAPAN BROADCASTING CORPORATION, Tokyo (JP); IKEGAMI TSUSHINKI CO., LTD., Tokyo (JP)

(*) Notice: Subject to any disclaimer, the term of this patent is extended or adjusted under 35 U.S.C. 154(b) by 0 days.

(21) Appl. No.: 15/054,738

(22) Filed: Feb. 26, 2016

(65) Prior Publication Data
US 2016/0178917 A1 Jun. 23, 2016

Related U.S. Application Data

(63) Continuation of application No. PCT/JP2014/072625, filed on Aug. 28, 2014.

(30) Foreign Application Priority Data

Aug. 29, 2013 (JP) ................................. 2013-178717

(51) Int. Cl.
H04N 9/07 (2006.01)
G02B 27/14 (2006.01)
(Continued)

(52) U.S. Cl.
CPC ............. *G02B 27/145* (2013.01); *G02B 5/04* (2013.01); *G02B 5/208* (2013.01); *G02B 5/282* (2013.01);
(Continued)

(58) Field of Classification Search
CPC ...................................................... H04N 9/097
(Continued)

(56) References Cited

U.S. PATENT DOCUMENTS

2002/0141070 A1 10/2002 Sawai
2008/0239501 A1 10/2008 Saita et al.

FOREIGN PATENT DOCUMENTS

JP 7-027908 A 1/1995
JP 11-194303 A 7/1999
(Continued)

OTHER PUBLICATIONS

International Search Report (PCT/ISA/210) issued in PCT/JP2014/072625, mailed on Nov. 11, 2014.
(Continued)

*Primary Examiner* — Gary C Vieaux
(74) *Attorney, Agent, or Firm* — Birch, Stewart, Kolasch & Birch, LLP

(57) ABSTRACT

A color separation optical assembly (3) of an image capture device (1) includes, in order from a light incidence side, a first prism (10) which has a first dichroic film (D1) and extracts blue light (LB) reflected by the first dichroic film, a second prism (20) which has a second dichroic film (D2) and extracts red light (LR) transmitted through the first dichroic film and reflected by the second dichroic film, and a third prism (30) which extracts green light (LG) transmitted through the first and second dichroic films. The first dichroic film is a multiband dichroic film which reflects light of an infrared region from a long wavelength side of a red region.

20 Claims, 11 Drawing Sheets

(51) Int. Cl.
*G02B 5/04* (2006.01)
*G02B 5/20* (2006.01)
*G02B 5/28* (2006.01)
*G02B 27/10* (2006.01)
*H04N 5/33* (2006.01)
*H04N 9/04* (2006.01)

(52) U.S. Cl.
CPC ......... *G02B 5/285* (2013.01); *G02B 27/1013* (2013.01); *G02B 27/141* (2013.01); *H04N 5/33* (2013.01); *H04N 9/045* (2013.01)

(58) Field of Classification Search
USPC ....................................................... 348/338
See application file for complete search history.

(56) References Cited

FOREIGN PATENT DOCUMENTS

| | | |
|---|---|---|
| JP | 2002-287248 A | 10/2002 |
| JP | 2005-223700 A | 8/2005 |
| JP | 2006-178264 A | 7/2006 |
| JP | 2008-116714 A | 5/2008 |
| JP | 2009-075543 A | 4/2009 |
| JP | 2010-026312 A | 2/2010 |
| JP | 2011-248047 A | 12/2011 |

OTHER PUBLICATIONS

Written Opinion (PCT/ISA/237) issued in PCT/JP2014/072625, mailed on Nov. 11, 2014.

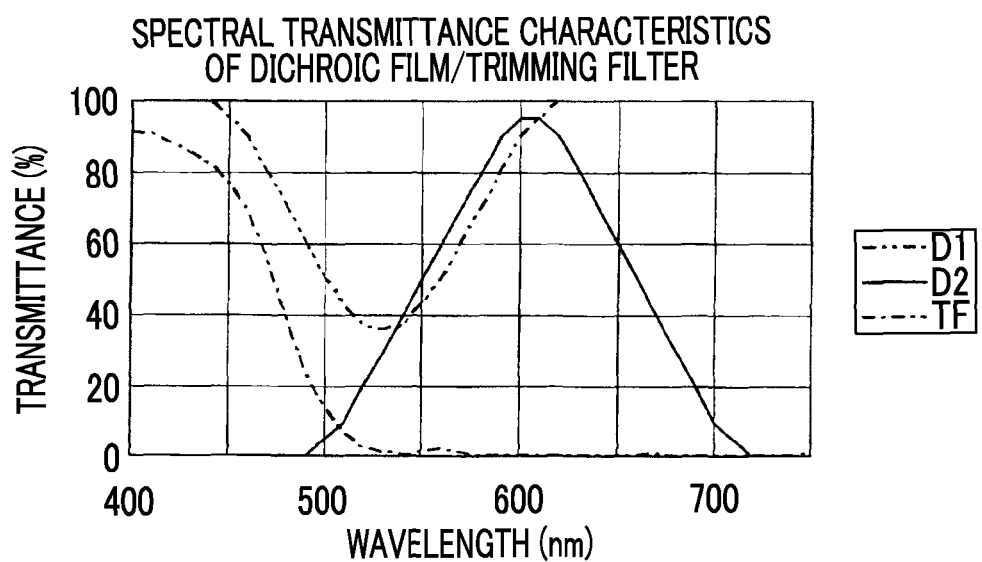
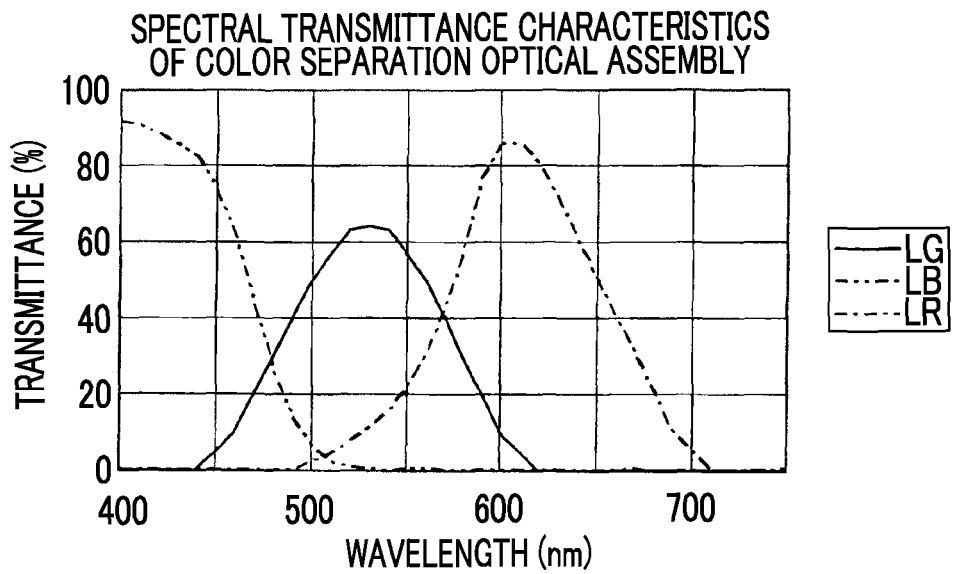

COLOR SEPARATION OPTICAL ASSEMBLY AND IMAGE CAPTURE DEVICE

CROSS REFERENCE TO RELATED APPLICATION

This is a continuation of International Application No. PCT/JP2014/072625 filed on Aug. 28, 2014, and claims priority from Japanese Patent Application No. 2013-178717, filed on Aug. 29, 2013, the entire disclosures of which are incorporated herein by reference.

BACKGROUND

1. Field of the Invention

The present invention relates to a color separation optical assembly and an image capture device.

2. Description of the Related Art

In an image capture device, such as a television camera or a video camera, a color separation optical assembly which separates incident light into three color light components of blue light, green light, and red light is used, and each separated color light component is received by an image capture element, such as a charge coupled device (CCD) image sensor provided for each color light component.

As this kind of color separation optical assembly, a Phillips type color separation optical assembly is known. The Phillips type color separation optical assembly includes, for example, a first prism in which a dichroic film reflecting blue light and transmitting green light and red light is formed on a reflection/transmission surface, a second prism in which a dichroic film reflecting red light and transmitting green light is formed on a reflection/transmission surface, and a third prism, and is configured to extract blue light with the first prism, to extract red light with the second prism, and to extract green light with the third prism.

From the standpoint of increasing sensitivity of the image capture device, for the dichroic film of the color separation optical assembly, typically, a dichroic film which has spectral transmittance characteristics with a comparatively steep slope is used. On the other hand, from the standpoint of approximating the sensitivity of the image capture device to the spectral sensitivity characteristics of the human eye to increase color reproducibility, a color separation optical assembly which uses a dichroic film having broad spectral transmittance characteristics with a comparatively gentle slope is known (for example, see JP2009-75543A).

The image capture element has sensitivity to infrared light which cannot be sensed with the human eye; thus, in order to block infrared light and to obtain characteristics similar to the spectral sensitivity characteristics of the human eye, in the color separation optical assembly described in JP-A-2009-75543, an absorption type visual sensitivity correction filter which cuts infrared light is provided on the light incidence side of the color separation optical assembly. Furthermore, in a color separation optical assembly described in JP-A-2010-26312, a reflection type infrared cut filter which is constituted of a dichroic film is provided on the light incidence side of the color separation optical assembly.

SUMMARY OF INVENTION

If infrared light is strictly cut by the absorption type visual sensitivity correction filter provided on the light incidence side of the color separation optical assembly to match the spectral sensitivity characteristics of the human eye, red light is also attenuated, and the sensitivity of the image capture device to red light is lowered. Then, in order to compensate for lowering of the sensitivity of the image capture device to red light, if the output of the image capture device is amplified through gain adjustment, noise may be increased and image quality may be degraded.

According to the reflection type infrared cut filter constituted of the dichroic film, it is possible to make approximation to the spectral sensitivity characteristics of the human eye and to realize the spectral transmittance characteristics with a steep slope rather than the visual sensitivity correction filter, and it is possible to strictly cut only infrared light while suppressing attenuation of red light. However, the reflection type infrared cut filter constituted of the dichroic film provided on the light incidence side of the color separation optical assembly reflects light reflected from the light receiving surface or the like of the image capture element again and directs light to an imaging surface, and stray light may be generated due to multiple reflection to cause degradation of image quality. If the slope of the spectral transmittance characteristics is made steeper, stray light can be suppressed; however, deviation from the spectral sensitivity characteristics of the human eye may occur, and color reproducibility may be lowered.

The invention has been accomplished in consideration of the above-described situation, and an object of the invention is to provide a color separation optical assembly and an image capture device which are excellent in color reproducibility, have less influence of a stray light component, and are excellent in image quality with less deterioration of an S/N ratio.

A color separation optical assembly according to an aspect of the invention which separates incident light into at least three color light components of blue light, red light, and green light includes, in order from a light incidence side, a first prism which has a first dichroic film and extracts a first color light component reflected by the first dichroic film, a second prism which has a second dichroic film and extracts a second color light component transmitted through the first dichroic film and reflected by the second dichroic film, and a third prism which extracts a third color light component transmitted through the first and second dichroic films. Red light is extracted from the second prism as the second color light component or is extracted from the third prism as the third color light component, and the dichroic film of at least one prism arranged closer to the light incidence side than the prism extracting red light out of the first and second prisms is a multiband dichroic film which reflects light of an infrared region from a long wavelength side of a red region. The color separation optical assembly further includes a trimming filter which cuts light of the infrared region from the long wavelength side of the red region from light emitted from the prism having the multiband dichroic film.

An image capture device according to an aspect of the invention includes the above-described color separation optical assembly, and a plurality of image capture elements which receive each color light component separated by the color separation optical assembly for each color light component.

The integrated spectral sensitivity characteristics of an image capture device with a color separation optical assembly using an absorption type visual sensitivity correction filter as a conventional example and an image capture device according to the aspect of the invention are compared. FIG. 11 shows an example of the configuration of the image capture device of the conventional example, FIG. 12 shows an example of the spectral sensitivity characteristics of the image capture device of the conventional example and the spectral transmittance characteristics of each of a visual sensitivity correction filter CF, a first dichroic film d1, and a second dichroic film d2, and FIG. 13 shows an example of the spectral sensitivity characteristics of the image capture device according to the aspect of the invention and the spectral transmittance characteristics of each of a first dichroic film D1 and a second dichroic film D2. Both of the image capture device of the conventional example and the image capture device according to the aspect of the invention are configured to extract blue light LB with the first prism having the first dichroic film, to extract red light LR with the second prism having the second dichroic film, and to extract green light LG with the third prism, ultraviolet rays are cut from incident light by an ultraviolet cut filter, and the integrated spectral sensitivity characteristics of the image capture device of the conventional example and the image capture device according to the aspect of the invention are obtained by calculating the product of spectral transmittance and spectral sensitivity values of a white light source, an imaging lens, an ultraviolet cut filter, a color separation optical assembly, and an image capture element, including a visual sensitivity correction filter in the conventional example.

In the image capture device of the conventional example shown in FIGS. 11 and 12, a curve on a longer wavelength side than a peak wavelength of an R component of the integrated spectral sensitivity characteristics is approximated to the spectral sensitivity characteristics of the human eye by the curve of the visual sensitivity correction filter CF. However, simultaneously, it is understood that the sensitivity of the R component is lowered due to the influence of the visual sensitivity correction filter CF compared to the sensitivity of a G component. In the image capture device having the spectral sensitivity characteristics, since the sensitivity of the R component is lowered, it is necessary to amplify the R component by multiplying the R component by a gain. In this case, there is a problem in that noise is also amplified through amplification, and the S/N ratio of the image capture device is deteriorated.

Next, in the image capture device according to the aspect of the invention shown in FIG. 13, since the spectral transmittance characteristics of the first dichroic film D1 become multiband characteristics in which light in the infrared region is reflected from the long wavelength side of the red region in addition to the blue light, the characteristics of the longer wavelength side than the peak wavelength of the R component of the integrated spectral sensitivity characteristics are approximated to the spectral sensitivity characteristics of the human eye by the curve of the first dichroic film D1. The sensitivity of the R component is maintained with high sensitivity equivalent to that of the G component by the spectral transmittance characteristics of the first dichroic film D1. Accordingly, in the image capture device having the spectral sensitivity characteristics, it is not necessary to specially increase the gain of the R component, and there is no problem in that the S/N ratio is deteriorated.

Therefore, in the invention, it is possible to provide a satisfactory image with less deterioration of an S/N ratio of the image capture device while maintaining color reproducibility equivalent to that in the conventional example.

According to the invention, it is possible to provide a color separation optical assembly and an image capture device which are excellent in color reproducibility, have less influence of a stray light component, and are excellent in image quality with less deterioration in an S/N ratio.

BRIEF DESCRIPTION OF DRAWINGS

FIGS. 8A and 8B are diagrams showing an example of the spectral transmittance characteristics of each of a first dichroic film, a second dichroic film, and a trimming filter of the color separation optical assembly of FIG. 7 and the spectral transmittance characteristics of the color separation optical assembly of FIG. 7.

DESCRIPTION OF EMBODIMENTS

Figure 1:
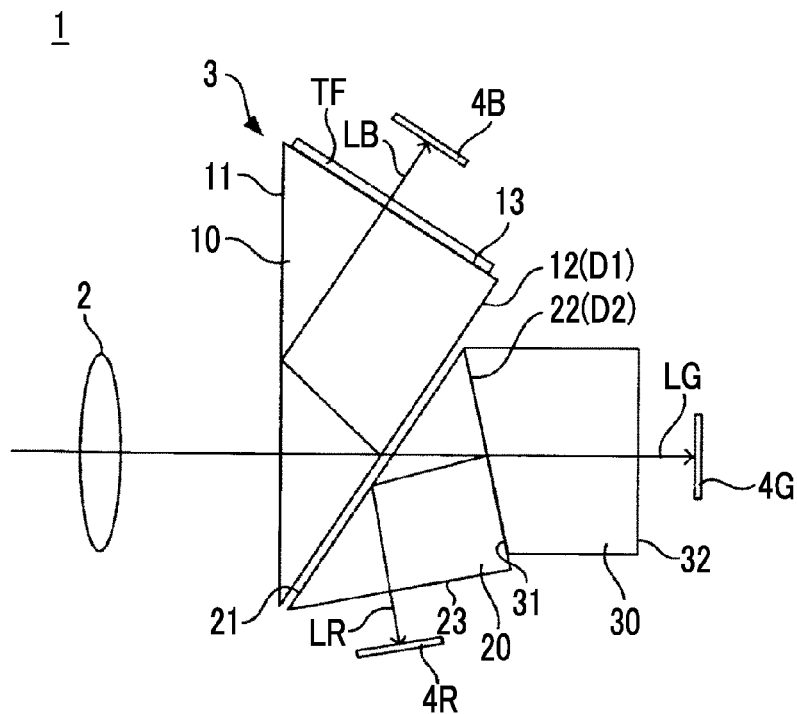
FIG. 1 is a diagram showing the configuration of an example of a color separation optical assembly and an image capture device according to an embodiment of the invention.

FIG. 1 shows the configuration of an example of a color separation optical assembly and an image capture device according to an embodiment of the invention.

An image capture device 1 shown in FIG. 1 includes a color separation optical assembly 3 which separates incident light incident through an imaging lens 2 into three color light components of blue light LB, green light LG, and red light LR, and image capture elements 4B, 4G, and 4R, such as a CCD, which receive blue light LB, green light LG, and red light LR separated by the color separation optical assembly 3 for each color light component.

The color separation optical assembly 3 is a so-called Phillips type color separation optical assembly, and includes, in order from a light incidence side, a first prism 10, a second prism 20, and a third prism 30, and is configured to extract blue light LB with the first prism 10, to extract red light LR with the second prism 20, and to extract green light LG with the third prism 30.

The first prism 10 has a light incidence surface 11, a reflection/transmission surface 12, and a light emission surface 13.

On the reflection/transmission surface 12, a first dichroic film D1 is formed. In the color separation optical assembly 3 configured to extract blue light LB with the first prism 10, the first dichroic film D1 is configured to reflect blue light and to transmit green light and red light, and in this example, is a multiband dichroic film which reflects light in an infrared region from a long wavelength side of a red region.

On the light emission surface 13, a trimming filter TF is provided. The trimming filter TF is an absorption type filter, and is configured to absorb and cut light in the infrared region from the long wavelength side of the red region among the components reflected from the first dichroic film D1 and to transmit blue light. Blue light LB transmitted through the trimming filter TF is received by the image capture element 4B. The trimming filter TF may be provided on the light emission surface 13 of the first prism 10, or may be provided between the first prism 10 and the image capture element 4B.

The second prism 20 has a light incidence surface 21, a reflection/transmission surface 22, and a light emission surface 23, and is arranged such that the light incidence surface 21 faces the reflection/transmission surface 12 of the first prism 10 at an air interval from the reflection/transmission surface 12 of the first prism 10.

Green light and red light transmitted through the first dichroic film D1 of the first prism 10 are incident on the light incidence surface 21.

On the reflection/transmission surface 22, a second dichroic film D2 is formed. In the color separation optical assembly 3 configured to extract red light LR with the second prism 20, the second dichroic film D2 is configured to reflect red light and to transmit green light out of green light and red light transmitted through the first dichroic film D1 of the first prism 10. Red light LR reflected from the second dichroic film D2 is received by the image capture element 4R.

The third prism 30 has a light incidence surface 31 and a light emission surface 32, and is arranged such that the light incidence surface 31 is bonded to the reflection/transmission surface 22 of the second prism 20. Green light LG transmitted through the second dichroic film D2 of the second prism 20 is received by the image capture element 4G through the third prism 30.

Figure 2:
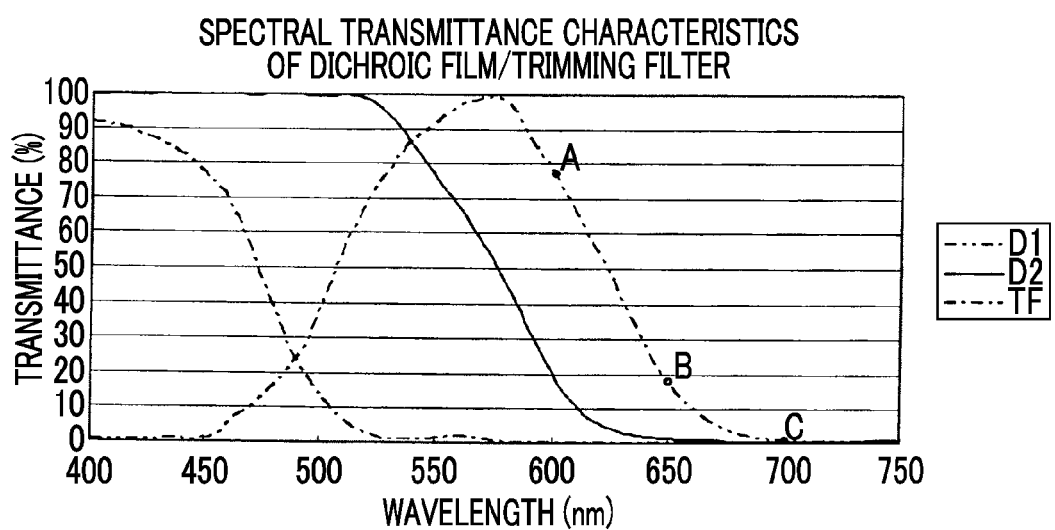
FIG. 2 is a diagram showing an example of the spectral transmittance characteristics of each of a first dichroic film, a second dichroic film, and a trimming filter of the color separation optical assembly of FIG. 1.
Figure 3:
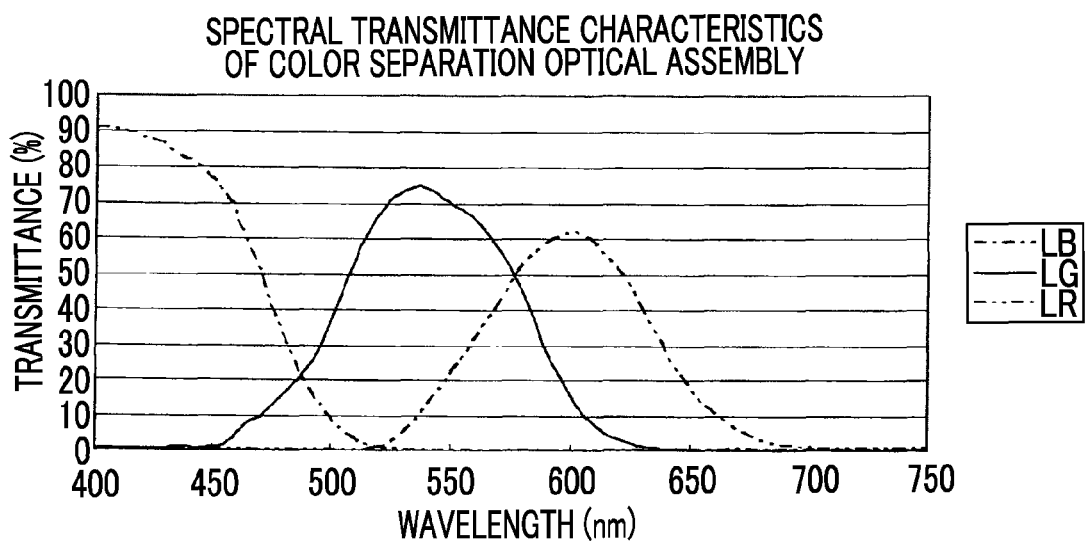
FIG. 3 is a diagram showing an example of the spectral transmittance characteristics of the color separation optical assembly of FIG. 1.

FIG. 2 shows an example of the spectral transmittance characteristics of the first dichroic film D1, the second dichroic film D2, and the trimming filter TF of the color separation optical assembly 3, and FIG. 3 shows an example of the spectral transmittance characteristics of the color separation optical assembly 3.

The first dichroic film D1 is configured to reflect blue light and light in the infrared region from the long wavelength side of the red region, the transmittance of a wavelength shorter than about 450 nm becomes 0% on a short wavelength side, and the transmittance of a wavelength longer than about 700 nm becomes about 0% on a long wavelength side. In this case, the boundary of a wavelength at which the transmittance of the short wavelength side is equal to or less than 10% such that the influence on image formation is negligible is defined as a cutoff transmission wavelength of the short wavelength side, and similarly, the boundary of a wavelength at which the transmittance of the long wavelength side is equal to or less than 10% is defined as a cutoff transmission wavelength of the long wavelength side. Like an absorption filter, only the long wavelength side or the short wavelength side may have a cutoff transmission wavelength. It is assumed that blue light has the peak of the transmittance around 440 nm in a range where the cutoff transmission wavelength of the short wavelength side is 400 nm (±30 nm) and the cutoff transmission wavelength of the long wavelength side is 500 nm (±30 nm), green light has the peak of the transmittance around 550 nm in a range where the cutoff transmission wavelength of the short wavelength side is 470 nm (±30 nm) and the cutoff transmission wavelength of the long wavelength side is 610 nm (±30 nm), red light has the peak of the transmittance around 600 nm in a range where the cutoff transmission wavelength of the short wavelength side is 550 nm (±30 nm) and the cutoff transmission wavelength of the long wavelength side is 700 nm (±30 nm), and the infrared region is a range of a wavelength of 700 nm (±30 nm) to about 1000 nm where the sensitivity of the image capture element is eliminated.

Among the components reflected from the first dichroic film D1, light of the infrared region from the long wavelength side of the red region is cut by the trimming filter TF. For this reason, the component received by the image capture element 4B becomes blue light LB. While the second dichroic film D2 is configured to reflect infrared light alone, since infrared light is cut by the first dichroic film D1, infrared light does not reach the light emission surface 23 of the second prism 20. For this reason, the component received by the image capture element 4R becomes red light LR. With this, it is possible to obtain the characteristics similar to the spectral sensitivity characteristics of the human eye which cannot sense infrared light. It is preferable that the first dichroic film D1 gradually decreases from the transmittance of 600 nm and becomes the cutoff transmission wavelength at 700 nm in order to cut infrared light. Since blue light LB received by the image capture element 4B and light of the infrared region from the long wavelength side of the red region cut by the trimming filter TF have wavelengths comparatively separated, light of the infrared region from the long wavelength side of the red region is easily cut by the trimming filter TF. In general, while the trimming filter for use in the color separation optical assembly is a filter which cuts light other than a wavelength band received by the image capture element, in the color separation optical assembly 3, it should suffice that light of the infrared region from the long wavelength side of the red region out of light toward the image capture element 4B side on which blue light LB is received is cut, any filter can be used as long as the filter can transmit blue light LB toward the image capture element 4B and can cut light in the infrared region from the long wavelength side of the red region, and a degree of freedom in selecting characteristics is high.

In regard to red light LR received by the image capture element 4R, the peak wavelength of the spectral transmittance characteristics of the color separation optical assembly 3 becomes about 600 nm. While a conventional absorption visual sensitivity correction filter typically has characteristics such that the peak wavelength of the spectral transmittance characteristics is near 500 nm and spectral transmittance is gradually lowered toward the cutoff transmission wavelength of the long wavelength side of about 700 nm, the first dichroic film D1 has characteristics such that the peak wavelength of the spectral transmittance characteristics is near 600 nm, the transmittance at a wavelength of 600 nm is 80%, and the first dichroic film D1 have spectral transmittance characteristics with a steep slope compared to an absorption type visual sensitivity correction filter in an infrared region from the long wavelength side of the red region. With this, it is possible to suppress attenuation of red light LR, to eliminate the need of significant amplification of the output of the image capture device through gain adjustment for compensating for attenuation of red light, and to suppress an increase in noise to improve image quality.

For the trimming filter TF, both of a reflection type and an absorption type can be used. When the trimming filter TF is of a reflection type, the trimming filter has a characteristic to transmit only the wavelength band of blue light LB, whereby a light beam of the infrared region from the long wavelength side of red region unnecessary for the image capture element side is not transmitted; therefore, it is possible to avoid the influence of multiple reflection between the image capture element and the reflection type trimming filter. If the trimming filter TF is an absorption type filter, it should suffice that the filter has spectral characteristics capable of transmitting only the wavelength band of blue light LB and absorbing light of the infrared light from the long wavelength side of red region unnecessary for imaging; therefore, a degree of freedom of the options of the material or thickness of the filter is significantly extended compared to the conventional visual sensitivity correction filter.

The spectral transmittance characteristics of the first dichroic film D1 from the long wavelength side of the red region to the infrared region preferably satisfy $2<(A-C)/(B-C)<10$ (where $65<A\leq100$, $0\leq C<10$), more preferably satisfy $2.5<(A-C)/(B-C)<8$, and particularly preferably satisfy $3<(A-C)/(B-C)<6$ when the transmittance at a wavelength of 600 nm is A (%), the transmittance at a wavelength of 650 nm is B (%), and the transmittance at a wavelength of 700 nm is C (%). An upper limit of $(A-C)/(B-C)$ is maintained and the slope of the spectral transmittance characteristics is given, whereby the spectral transmittance characteristics of a light beam which reaches the image capture element 4R receiving red light LR are similar to the spectral sensitivity characteristics of the human eye; therefore, it is possible to secure color reproducibility of a red object. A lower limit of $(A-C)/(B-C)$ is maintained, whereby it is possible to prevent the slope of the spectral transmittance characteristics from being excessively gentle, that is, to prevent the amount of light from being lowered due to the reflection of red light from the dichroic film, and as a result, to prevent an increase in noise through gain adjustment of an amplifier of the image capture element 4R. More than a lower limit value of A increases the use efficiency of red light contributing to imaging, and contributes to an increase in the sensitivity of the R component. The use efficiency of red light is preferably equal to or greater than 70%, and more preferably equal to or greater than 75%.

From the standpoint of maintaining color reproducibility of red and increasing the amount of light with a conventional general absorption type visual sensitivity correction filter, the above expression defines the ratio of the transmittance at the wavelengths of 600 nm and 650 nm and the transmittance at the wavelength of 700 nm. When the transmittance at the wavelength of 600 nm of the absorption type visual sensitivity correction filter of the conventional example is a (%), the transmittance at the wavelength of 650 nm is b (%), and the transmittance at the wavelength of 700 nm is c (%), and a proportional coefficient of an increase in the amount of light is α, when the relationships of $A=\alpha \times a$, $B=\alpha \times b$, and $C=\alpha \times c$ are established, that is, when $A:B:C=a:b:c$, color reproducibility of red is equivalent between the absorption type visual sensitivity correction filter of the conventional example and the first dichroic film D1. However, since the amount of transmitted light at the wavelength of 700 nm near the cutoff transmission wavelength of the long wavelength side is a minute amount, regarding the transmittance at the wavelength of 700 nm, a variation of about 1% to 10% is sufficiently permitted. Accordingly, the ratio of the transmittance at the wavelengths of 600 nm and 650 nm is defined as shown in the above expression, the ratio of the transmittance at the wavelengths of 600 nm and 650 nm is in the above-described range, and the transmittance at the wavelength of 700 nm is limited so as not to be excessively high, whereby it is possible to maintain color reproducibility of red in the general absorption type visual sensitivity correction filter of the conventional example and to achieve an increase in the amount of light.

The first dichroic film D1 having the above spectral transmittance characteristics can be formed, for example, with a film configuration shown in Table 1.

TABLE 1

|  | Material | Refractive Index | Layer Thickness (nm) |
| --- | --- | --- | --- |
| 1st Layer (Incidence Side) | $TiO_2$ | 2.35 | 28 |
| 2nd Layer | $SiO_2$ | 1.47 | 75 |
| 3rd Layer | $TiO_2$ | 2.35 | 40 |
| 4th Layer | $SiO_2$ | 1.47 | 70 |
| 5th Layer | $TiO_2$ | 2.35 | 48 |
| 6th Layer | $SiO_2$ | 1.47 | 81 |
| 7th Layer | $TiO_2$ | 2.35 | 46 |
| 8th Layer | $SiO_2$ | 1.47 | 69 |
| 9th Layer | $TiO_2$ | 2.35 | 44 |
| 10th Layer | $SiO_2$ | 1.47 | 81 |
| 11th Layer | $TiO_2$ | 2.35 | 52 |
| 12th Layer | $SiO_2$ | 1.47 | 81 |
| 13th Layer | $TiO_2$ | 2.35 | 42 |
| 14th Layer | $SiO_2$ | 1.47 | 46 |
| 15th Layer | $TiO_2$ | 2.35 | 72 |
| 16th Layer | $SiO_2$ | 1.47 | 183 |
| 17th Layer | $TiO_2$ | 2.35 | 99 |
| 18th Layer | $SiO_2$ | 1.47 | 150 |
| 19th Layer | $TiO_2$ | 2.35 | 76 |
| 20th Layer | $SiO_2$ | 1.47 | 124 |
| 21st Layer | $TiO_2$ | 2.35 | 89 |
| 22nd Layer | $SiO_2$ | 1.47 | 142 |
| 23rd Layer | $TiO_2$ | 2.35 | 79 |
| 24th Layer | $SiO_2$ | 1.47 | 131 |
| 25th Layer | $TiO_2$ | 2.35 | 89 |

TABLE 1-continued

| | Material | Refractive Index | Layer Thickness (nm) |
|---|---|---|---|
| 26th Layer | SiO$_2$ | 1.47 | 131 |
| 27th Layer | TiO$_2$ | 2.35 | 82 |
| 28th Layer | SiO$_2$ | 1.47 | 160 |
| 29th Layer | TiO$_2$ | 2.35 | 83 |
| 30th Layer | SiO$_2$ | 1.47 | 163 |
| 31st Layer | TiO$_2$ | 2.35 | 86 |
| 32nd Layer (Emission Side) | SiO$_2$ | 1.47 | 288 |

Figure 4:
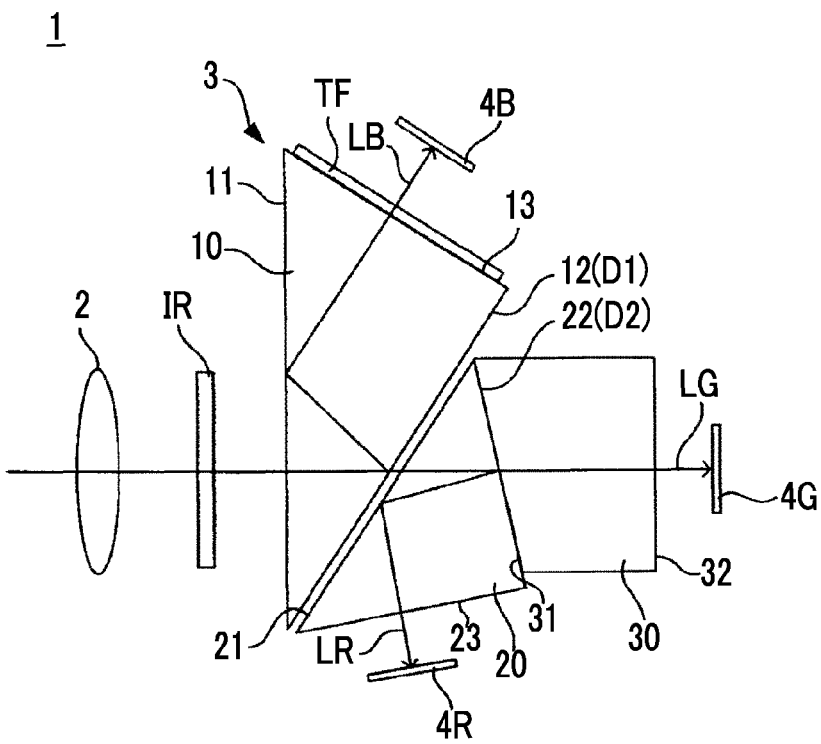
FIG. 4 is a diagram showing the configuration of a modification example of the color separation optical assembly of FIG. 1.

FIG. 4 shows the configuration of a modification example of the color separation optical assembly 3 described above.

In the example shown in FIG. 4, an infrared cut filter IR is arranged on the light incidence side of the first prism 10. The infrared cut filter IR is used simultaneously, whereby it is possible to sufficiently cut infrared light to obtain characteristics similar to the spectral sensitivity characteristics of the human eye, to configure the first dichroic film D1 focusing on the reflection of light of the long wavelength side of the red region, and to increase color reproducibility of red. The infrared cut filter IR may be provided between the first prism 10 and the imaging lens 2, or may be provided on the light incidence surface of the first prism 10.

Figure 15:
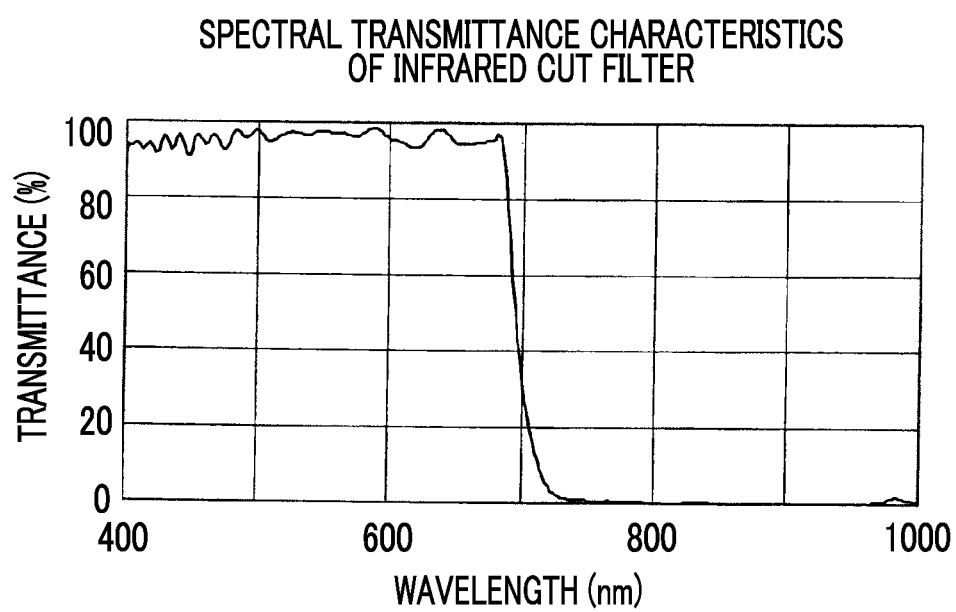
FIG. 15 is a diagram showing an example of the spectral transmittance characteristics of an infrared cut filter.

As shown in FIG. 15, as the infrared cut filter IR, an absorption type filter or a reflection type filter in which the cutoff transmission wavelength of the long wavelength side is on a longer wavelength side than the cutoff transmission wavelength of the long wavelength side of the first dichroic film D1 can be suitably used, and accordingly, it is possible to prevent the occurrence of stray light and to prevent attenuation of red light LR without affecting color reproducibility.

Figure 5:
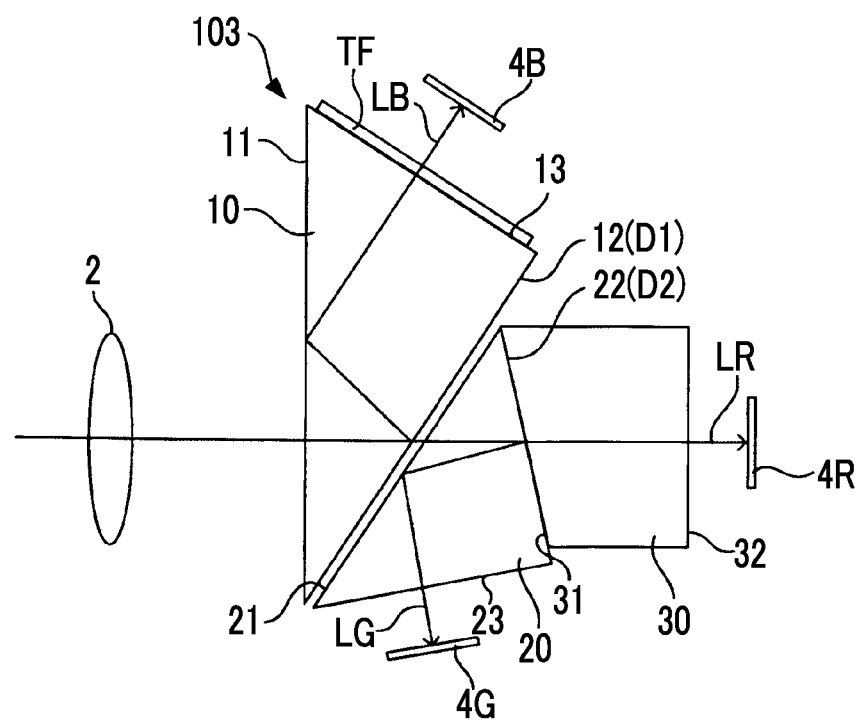
FIG. 5 is a diagram showing the configuration of another example of a color separation optical assembly and an image capture device according to the embodiment of the invention.

FIG. 5 is a diagram showing the configuration of another example of a color separation optical assembly and an image capture device according to the embodiment of the invention.

A color separation optical assembly 103 shown in FIG. 5 includes, in order from the light incidence side, a first prism 10, a second prism 20, and a third prism 30, and is configured to extract blue light LB with the first prism 10, to extract green light LG with the second prism 20, and to extract red light LR with the third prism 30.

A first dichroic film D1 is formed on the reflection/transmission surface 12 of the first prism 10, and the first dichroic film D1 is configured to reflect blue light and light in the infrared region from the long wavelength side of the red region. On the light emission surface 13 of the first prism 10, an absorption type trimming filter TF which transmits blue light LB out of the components reflected from the first dichroic film D1 and cuts light in the infrared region from the long wavelength side of the red region is provided. Blue light LB transmitted through the trimming filter TF is received by the image capture element 4B.

On the reflection/transmission surface 22 of the second prism 20, a second dichroic film D2 is formed. In the color separation optical assembly 103 configured to extract green light LG with the second prism 20, the second dichroic film D2 reflects green light out of green light and red light transmitted through the first dichroic film D1 and transmits red light. Green light LG reflected from the second dichroic film D2 is received by the image capture element 4G.

Then, red light LR transmitted through the second dichroic film D2 of the second prism 20 is received by the image capture element 4R through the third prism 30.

Figure 6A:
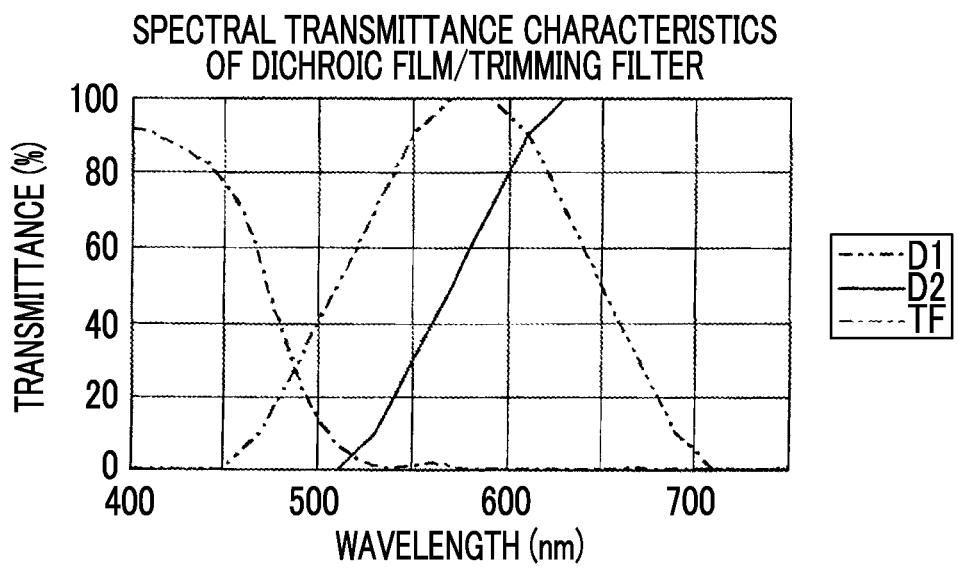
FIGS. 6A and 6B are diagrams showing an example of the spectral transmittance characteristics of each of a first dichroic film, a second dichroic film, and a trimming filter of the color separation optical assembly of FIG. 5 and the spectral transmittance characteristics of the color separation optical assembly of FIG. 5.
Figure 6B:
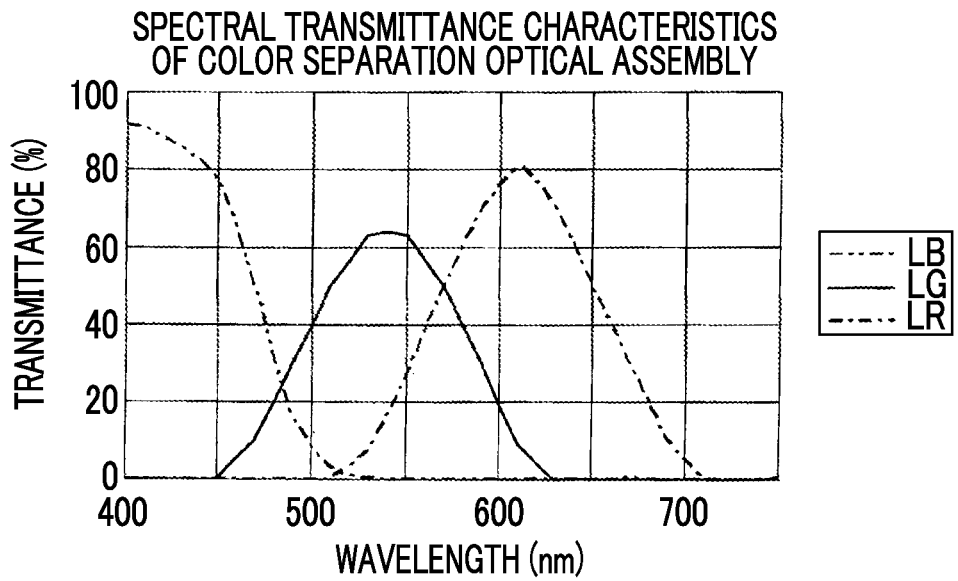

FIGS. 6A and 6B show an example of the spectral transmittance characteristics of each of the first dichroic film D1, the second dichroic film D2, and the trimming filter TF of the color separation optical assembly 103 and the spectral transmittance characteristics of the color separation optical assembly 103.

Figure 7:
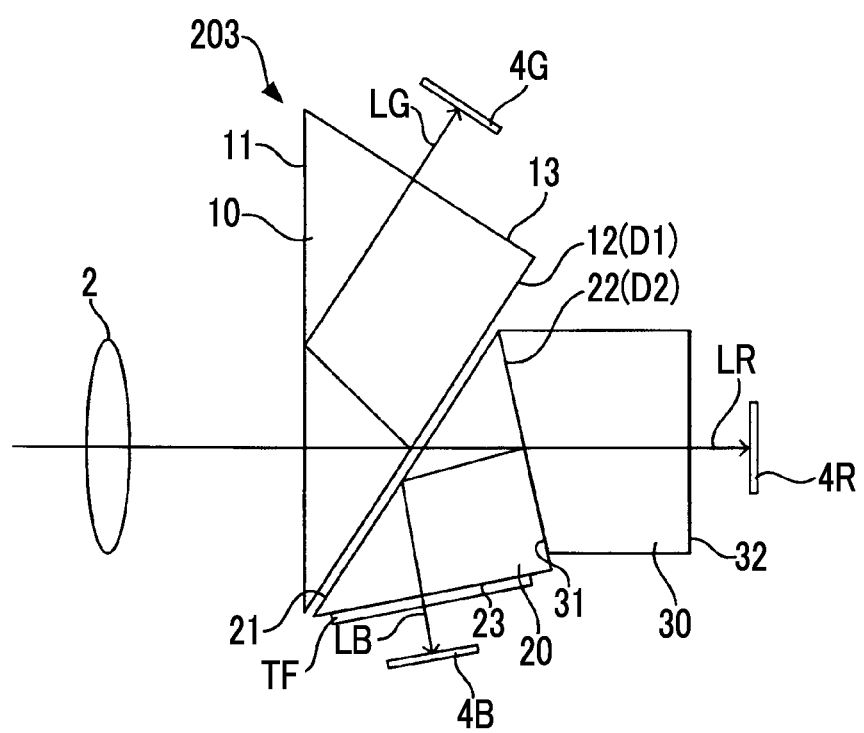
FIG. 7 is a diagram showing the configuration of another example of a color separation optical assembly and an image capture device according to the embodiment of the invention.

FIG. 7 is a diagram showing the configuration of another example of a color separation optical assembly and an image capture device according to the embodiment of the invention.

A color separation optical assembly 203 shown in FIG. 7 includes, in order from the light incidence side, a first prism 10, a second prism 20, and a third prism 30, and is configured to extract green light LG with the first prism 10, to extract blue light LB with the second prism 20, and to extract red light LR with the third prism 30.

A first dichroic film D1 is formed on the reflection/transmission surface 12 of the first prism 10, and the first dichroic film D1 is configured to reflect green light. Green light LG reflected from the first dichroic film D1 is received by the image capture element 4G.

A second dichroic film D2 is formed on the reflection/transmission surface 22 of the second prism 20, and the second dichroic film D2 is configured to reflect blue light and light of the infrared region from the long wavelength side of the red region. On the light emission surface 23 of the second prism 20, an absorption type trimming filter TF which transmits blue light LB out of the components reflected from the second dichroic film D2 and cuts light of the infrared region from the long wavelength side of the red region is provided. Blue light LB transmitted through the trimming filter TF is received by the image capture element 4B.

Then, red light LR transmitted through the second dichroic film D2 of the second prism 20 is received by the image capture element 4R through the third prism 30.

FIGS. 8A and 8B show an example of the spectral transmittance characteristics of each of the first dichroic film D1, the second dichroic film D2, and the trimming filter TF of the color separation optical assembly 203 and the spectral transmittance characteristics of the color separation optical assembly 203.

With the color separation optical assemblies 103 and 203, similarly to the color separation optical assembly 3 described above, it is possible to increase color reproducibility and image quality. In the color separation optical assemblies 103 and 203, similarly to the color separation optical assembly 3 described above, the infrared cut filter IR can be provided on the light incidence side of the first prism 10.

Figure 9A:
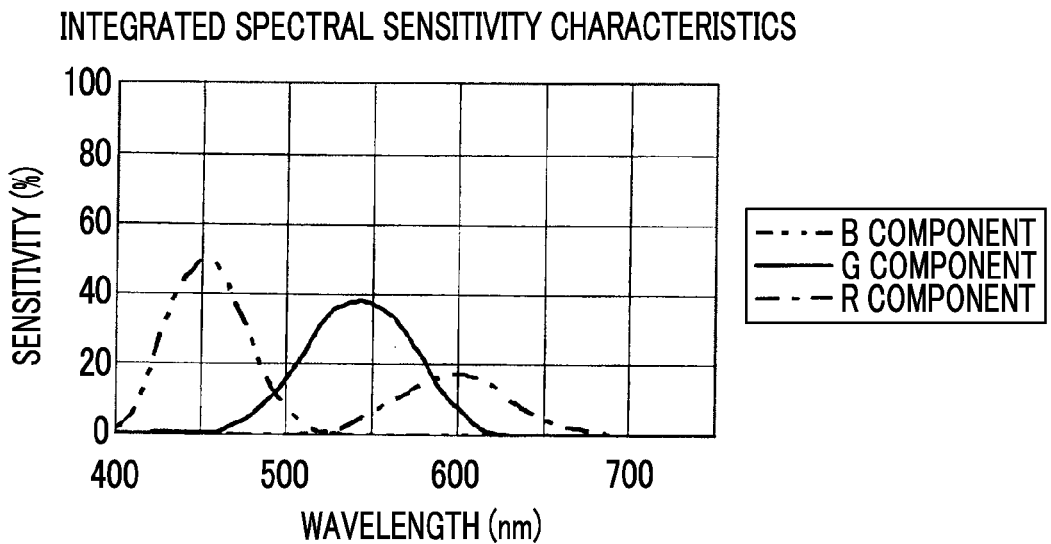
FIGS. 9A and 9B are diagrams showing an example of the integrated spectral sensitivity characteristics of an image capture device with a color separation optical assembly of a conventional example and spectral sensitivity characteristics when normalized with the peak value of each of B, G, and R.
Figure 9B:
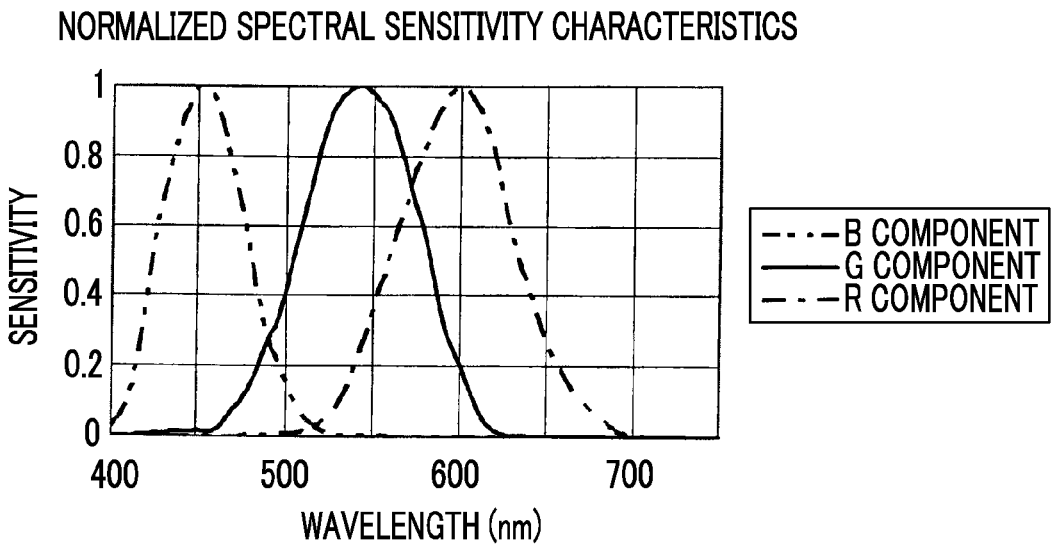
Figure 10A:
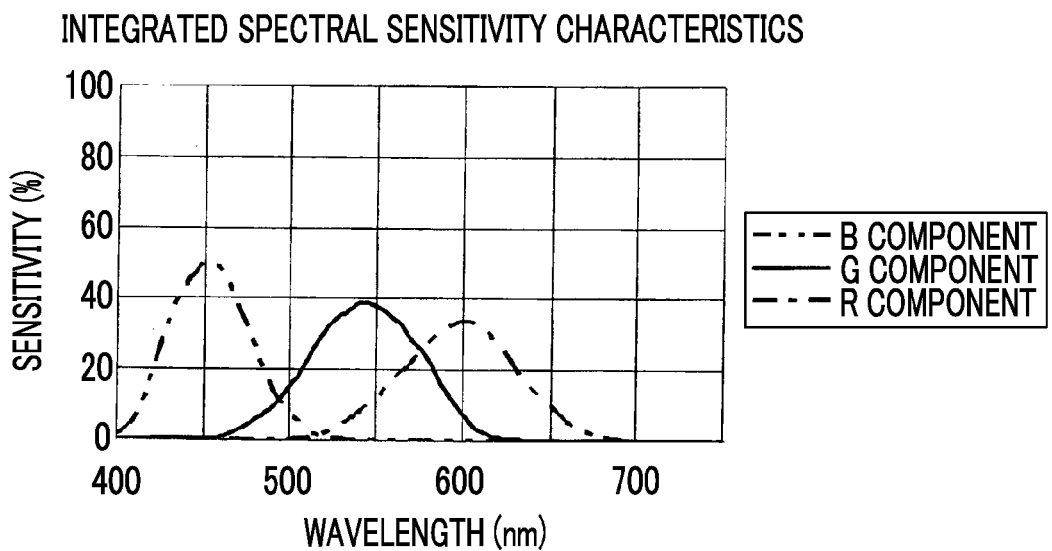
FIGS. 10A and 10B are diagrams showing the integrated spectral sensitivity characteristics of the image capture device of FIG. 1 and spectral sensitivity characteristics when normalized with the peak value of each of B, G, and R.
Figure 10B:
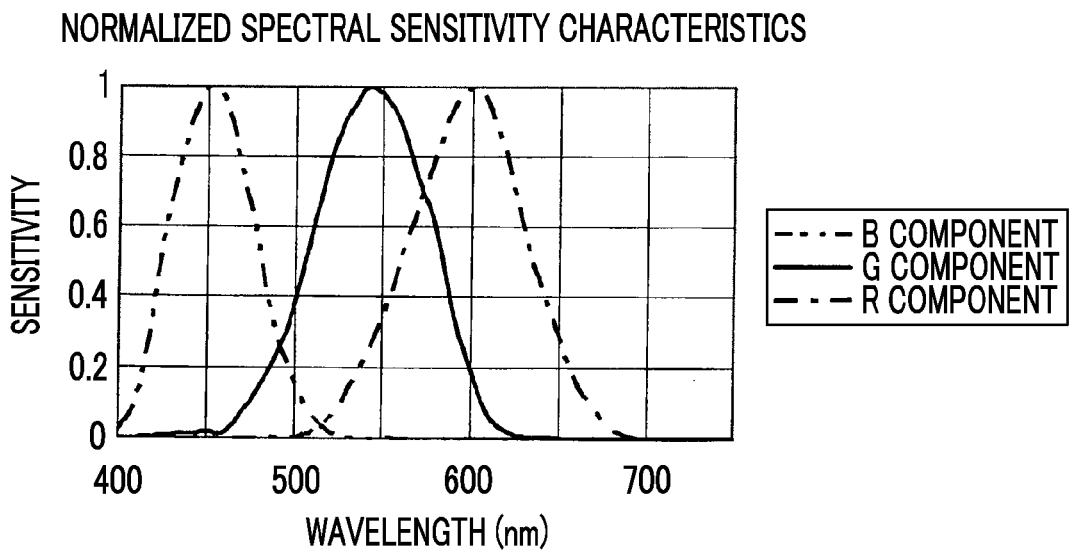
Figure 11:
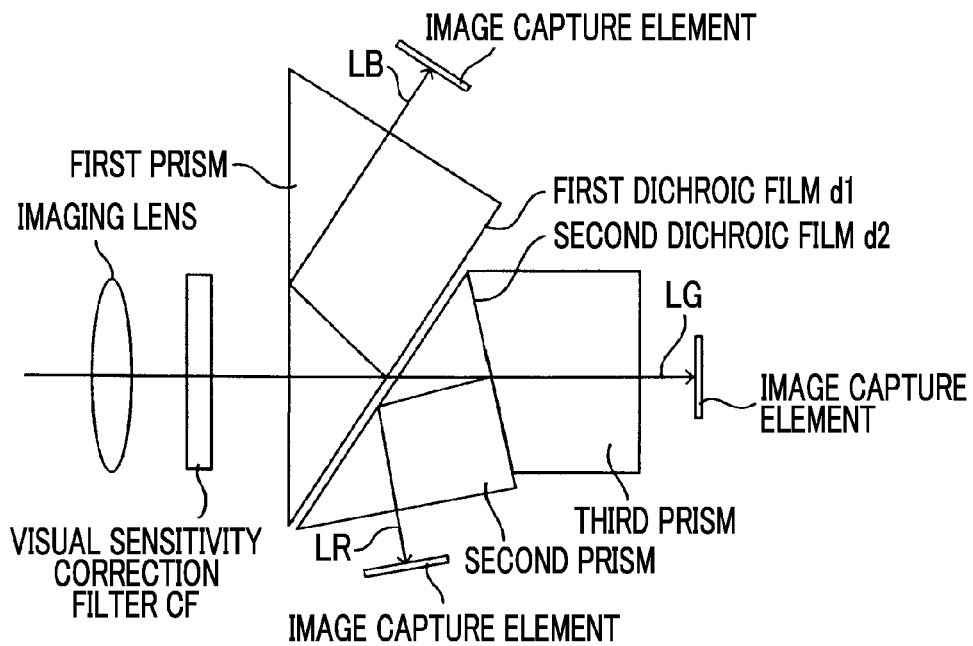
FIG. 11 is a diagram showing an example of the configuration of a color separation optical assembly of the conventional example.
Figure 12:
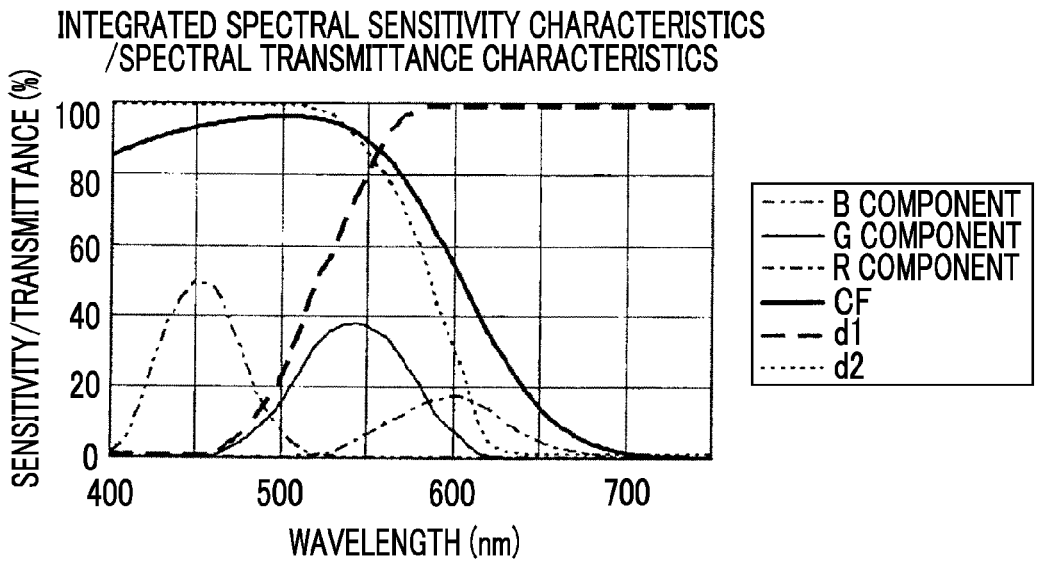
FIG. 12 is a diagram showing an example of the integrated spectral sensitivity characteristics and the spectral transmittance characteristics of an image capture device of the conventional example.
Figure 13:
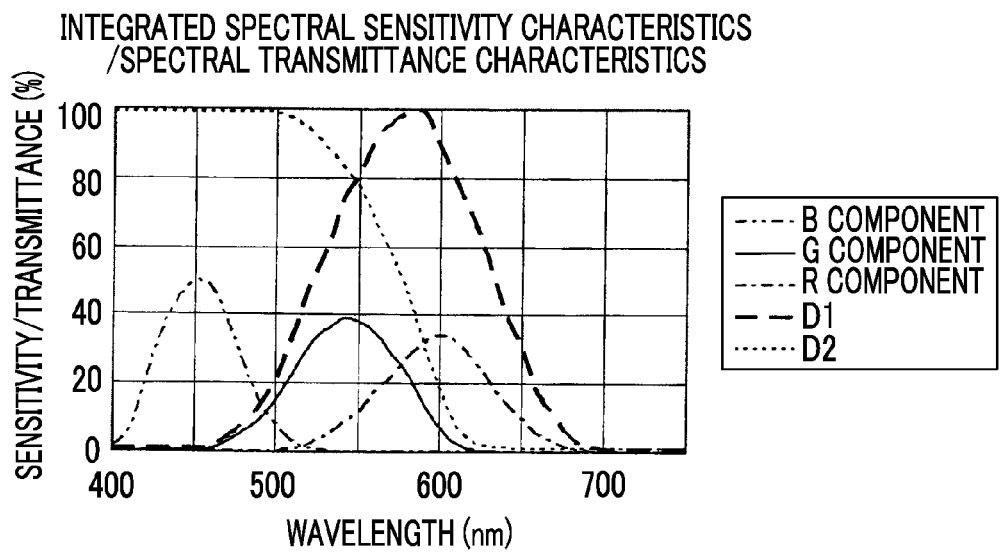
FIG. 13 is a diagram showing an example of the integrated spectral sensitivity characteristics and the spectral transmittance characteristics of an image capture device according to an aspect of the invention.
Figure 14:
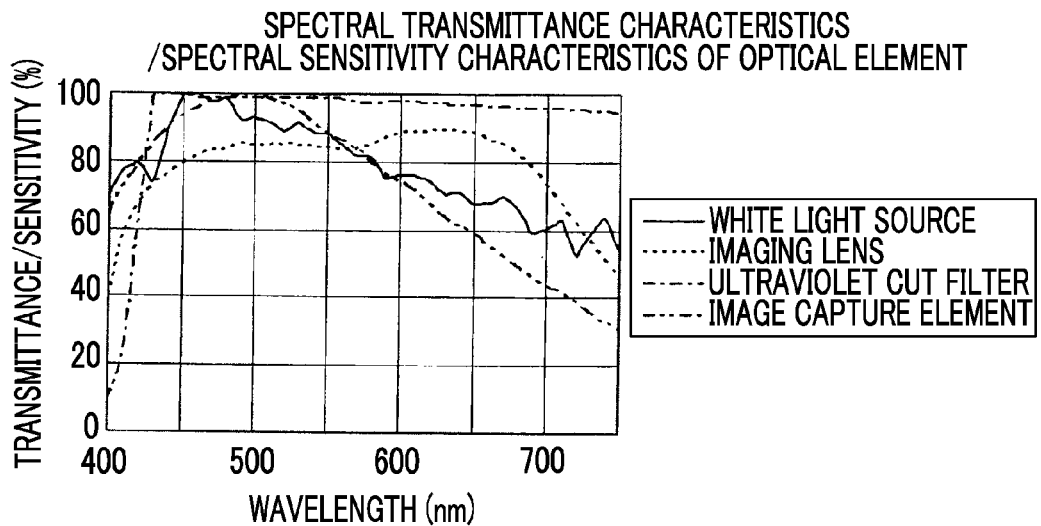
FIG. 14 is a diagram showing an example of the spectral transmittance characteristics and the spectral sensitivity characteristics of each optical element of a white light source, an imaging lens, an ultraviolet cut filter, and an image capture element.

Hereinafter, the integrated spectral sensitivity characteristics of an image capture device with a color separation optical assembly using an absorption type visual sensitivity correction filter as a conventional example and an image capture device according to an aspect of the invention are compared. FIGS. 9A and 9B show the integrated spectral sensitivity characteristics of the image capture device of the conventional example and normalized spectral sensitivity characteristics when normalized with a peak value of each of B, G, and R, and FIGS. 10A and 10B show the integrated spectral sensitivity characteristics of the image capture device 1 described above and normalized spectral sensitivity characteristics when normalized with a peak value of each of B, G, and R. The integrated spectral sensitivity characteristics are obtained by calculating the product of spectral transmittance and spectral sensitivity values of a white light source, an imaging lens, an ultraviolet cut filter, a color separation optical assembly, and an image capture element, including the visual sensitivity correction filter in the conventional example, and FIG. 14 shows the spectral transmittance characteristics and the spectral sensitivity characteristics of each optical element of the white light source, the imaging lens, the ultraviolet cut filter, and the image capture element.

It is understood that the normalized spectral sensitivity characteristics are substantially the same in the conventional example shown in FIGS. 9A and 9B and the image capture device 1 shown in FIGS. 10A and 10B, and regarding color reproducibility, the same capability can be exhibited. However, in the integrated spectral sensitivity characteristics, while the peak of the R component in the conventional example largely decreases with respect to the peak of the G component, the peak of the R component in the image capture device 1 substantially indicates the same sensitivity as the peak of the G component. The integrated values of B, G, and R at 400 nm to 750 nm become B:G:R=0.92:1.00:0.45 in the conventional example, and become B:G:R=0.93:1.00:0.86 in the image capture device 1.

In a color imaging camera, an operation of white balance adjustment to match B:G:R=1:1:1 is performed such that a white object is necessarily imaged at the time of imaging and this is reproduced white; however, at this time, in the conventional example, it is necessary to multiply the R component by a gain equal to or greater than two times in order to match the output of the R component with the G component. Accordingly, a noise component of the R component may also be amplified and the S/N ratio of the camera may be deteriorated. In contrast, according to the image capture device 1, since the gain of the R component is equal to or less than 1.2 times, it is possible to significantly suppress amplification of noise and to suppress deterioration of the S/N ratio.

Therefore, the image capture device 1 can achieve both satisfactory color reproduction and a satisfactory image with less deterioration of an S/N ratio.

As described above, the following matters are disclosed in this specification.

(1) A color separation optical assembly which separates incident light into at least three color light components of blue light, red light, and green light including, in order from a light incidence side, a first prism which has a first dichroic film and extracts a first color light component reflected by the first dichroic film, a second prism which has a second dichroic film and extracts a second color light component transmitted through the first dichroic film and reflected by the second dichroic film, and a third prism which extracts a third color light component transmitted through the first and second dichroic films, in which red light is extracted from the second prism as the second color light component or is extracted from the third prism as the third color light component, the dichroic film of at least one prism arranged closer to the light incidence side than the prism extracting red light out of the first and second prisms is a multiband dichroic film which reflects light of an infrared region from a long wavelength side of a red region, and the color separation optical assembly further includes a trimming filter which cuts light of the infrared region from the long wavelength side of the red region from light emitted from the prism having the multiband dichroic film.

(2) The color separation optical assembly described in (1), in which the trimming filter is provided on a light emission surface of the prism having the multiband dichroic film or between the prism and an image capture element which receives light emitted from the prism.

(3) The color separation optical assembly described in (2), in which the trimming filter is an absorption type filter.

(4) The color separation optical assembly described in any one of (1) to (3), in which spectral transmittance characteristics of the multiband dichroic film decrease monotonously from the long wavelength side of the red region to the infrared region.

(5) The color separation optical assembly described in any one of (1) to (4), in which the spectral transmittance characteristics of the long wavelength side of the multiband dichroic film have spectral transmittance characteristics represented by the following expression:

$$2<(A-C)/(B-C)<10, 65<A\leq100, 0\leq C<10$$

where transmittance at a wavelength of 600 nm is A (%), transmittance at a wavelength of 650 nm is B (%), and transmittance at a wavelength of 700 nm is C (%).

(6) The color separation optical assembly described in (5), in which the spectral transmittance characteristics of the long wavelength side of the multiband dichroic film have spectral transmittance characteristics represented by the following expression:

$$2.5<(A-C)/(B-C)<8.$$

(7) The color separation optical assembly described in (6), in which the spectral transmittance characteristics of the long wavelength side of the multiband dichroic film have spectral transmittance characteristics represented by the following expression:

$$3<(A-C)/(B-C)<6.$$

(8) The color separation optical assembly described in any one of (1) to (7), in which an infrared cut filter is provided on a light incidence surface of the first prism or between the first prism and an imaging lens which makes light incident on the first prism.

(9) The color separation optical assembly described in (8), in which a cutoff transmission wavelength of a long wavelength side of the infrared cut filter is closer to a long wavelength side than the cutoff transmission wavelength of the long wavelength side in the infrared region of the multiband dichroic film.

(10) The color separation optical assembly described in (8) or (9), in which the infrared cut filter is an absorption or reflection type filter.

(11) The color separation optical assembly described in any one of (1) to (10), in which the multiband dichroic film reflects blue light and light of the infrared region from the long wavelength side of the red region.

(12) An image capture device including the color separation optical assembly described in any one of (1) to (11), and a plurality of image capture elements which receive each color light component separated by the color separation optical assembly for each color light component.

According to the invention, it is possible to provide a color separation optical assembly and an image capture device which are excellent in color reproducibility, have less influence of a stray light component, and are excellent in image quality with less deterioration of an S/N ratio.

Although the embodiment of the invention has been described, the embodiment is just for illustration, and the invention can be carried out in various altered forms without departing from the spirit of the invention.

REFERENCE SIGNS LIST

1: image capture device
2: imaging lens
3: color separation optical assembly
4B, 4R, 4G: image capture element
10: first prism
20: second prism
30: third prism
D1: first dichroic film (multiband dichroic film)
D2: second dichroic film
TF: trimming filter
IR: infrared cut filter
LB: blue light
LG: green light
LR: red light

What is claimed is:

1. A color separation optical assembly which separates incident light into at least three color light components of blue light, red light, and green light, the color separation optical assembly comprising, in order from a light incidence side:
a first prism which has a first dichroic film and extracts a first color light component reflected by the first dichroic film;
a second prism which has a second dichroic film and extracts a second color light component transmitted through the first dichroic film and reflected by the second dichroic film; and
a third prism which extracts a third color light component transmitted through the first and second dichroic films,
wherein red light is extracted from the second prism as the second color light component or is extracted from the third prism as the third color light component,
the dichroic film of at least one prism arranged closer to the light incidence side than the prism extracting red light out of the first and second prisms is a multiband dichroic film which reflects light of an infrared region from a long wavelength side of a red region, and
the color separation optical assembly further comprises:
a trimming filter which cuts light of the infrared region from the long wavelength side of the red region from light emitted from the prism having the multiband dichroic film.

2. The color separation optical assembly according to claim 1,
wherein the trimming filter is provided on a light emission surface of the prism having the multiband dichroic film or between the prism and an image capture element which receives light emitted from the prism.

3. The color separation optical assembly according to claim 2,
wherein the trimming filter is an absorption type filter.

4. The color separation optical assembly according to claim 1,
wherein spectral transmittance characteristics of the multiband dichroic film decrease monotonously from the long wavelength side of the red region to the infrared region.

5. The color separation optical assembly according to claim 2,
wherein spectral transmittance characteristics of the multiband dichroic film decrease monotonously from the long wavelength side of the red region to the infrared region.

6. The color separation optical assembly according to claim 3,
wherein spectral transmittance characteristics of the multiband dichroic film decrease monotonously from the long wavelength side of the red region to the infrared region.

7. The color separation optical assembly according to claim 1,
wherein spectral transmittance characteristics of the long wavelength side of the multiband dichroic film have spectral transmittance characteristics represented by the following expression:

$$2<(A-C)/(B-C)<10, 65<A\leq100, 0\leq C<10$$

where transmittance at a wavelength of 600 nm is A (%), transmittance at a wavelength of 650 nm is B (%), and transmittance at a wavelength of 700 nm is C (%).

8. The color separation optical assembly according to claim 7,
wherein the spectral transmittance characteristics of the long wavelength side of the multiband dichroic film have spectral transmittance characteristics represented by the following expression:

$$2.5<(A-C)/(B-C)<8.$$

9. The color separation optical assembly according to claim 8,
wherein the spectral transmittance characteristics of the long wavelength side of the multiband dichroic film have spectral transmittance characteristics represented by the following expression:

$$3<(A-C)/(B-C)<6.$$

10. The color separation optical assembly according to claim 2,
wherein spectral transmittance characteristics of the long wavelength side of the multiband dichroic film have spectral transmittance characteristics represented by the following expression:

$$2<(A-C)/(B-C)<10, 65<A\leq100, 0\leq C<10$$

where transmittance at a wavelength of 600 nm is A (%), transmittance at a wavelength of 650 nm is B (%), and transmittance at a wavelength of 700 nm is C (%).

11. The color separation optical assembly according to claim 10,
wherein the spectral transmittance characteristics of the long wavelength side of the multiband dichroic film have spectral transmittance characteristics represented by the following expression:

$$2.5<(A-C)/(B-C)<8.$$

12. The color separation optical assembly according to claim 11,
wherein the spectral transmittance characteristics of the long wavelength side of the multiband dichroic film have spectral transmittance characteristics represented by the following expression:

$$3<(A-C)/(B-C)<6.$$

13. The color separation optical assembly according to claim 4,
wherein spectral transmittance characteristics of the long wavelength side of the multiband dichroic film have spectral transmittance characteristics represented by the following expression:

$$2<(A-C)/(B-C)<10, 65<A\leq100, 0\leq C<10$$

where transmittance at a wavelength of 600 nm is A (%), transmittance at a wavelength of 650 nm is B (%), and transmittance at a wavelength of 700 nm is C (%).

14. The color separation optical assembly according to claim 13,
wherein the spectral transmittance characteristics of the long wavelength side of the multiband dichroic film have spectral transmittance characteristics represented by the following expression:

$$2.5<(A-C)/(B-C)<8.$$

15. The color separation optical assembly according to claim 14,
wherein the spectral transmittance characteristics of the long wavelength side of the multiband dichroic film have spectral transmittance characteristics represented by the following expression:

$$3<(A-C)/(B-C)<6.$$

16. The color separation optical assembly according to claim 1,
wherein an infrared cut filter is provided on a light incidence surface of the first prism or between the first prism and an imaging lens which makes light incident on the first prism.

17. The color separation optical assembly according to claim 16,
wherein a cutoff transmission wavelength of a long wavelength side of the infrared cut filter is closer to a long wavelength side than the cutoff transmission wavelength of the long wavelength side in the infrared region of the multiband dichroic film.

18. The color separation optical assembly according to claim 16,
wherein the infrared cut filter is an absorption or reflection type filter.

19. The color separation optical assembly according to claim 1,
wherein the multiband dichroic film reflects blue light and light of the infrared region from the long wavelength side of the red region.

20. An image capture device comprising:
the color separation optical assembly according to claim 1; and
a plurality of image capture elements which receive each color light component separated by the color separation optical assembly for each color light component.

* * * * *